United States Patent
Pan

(10) Patent No.: US 9,007,046 B2
(45) Date of Patent: Apr. 14, 2015

(54) EFFICIENT HIGH VOLTAGE BIAS REGULATION CIRCUIT

(71) Applicant: SanDisk Technologies Inc., Plano, TX (US)

(72) Inventor: Feng Pan, Fremont, CA (US)

(73) Assignee: SanDisk Technologies Inc., Plano, TX (US)

( * ) Notice: Subject to any disclaimer, the term of this patent is extended or adjusted under 35 U.S.C. 154(b) by 148 days.

(21) Appl. No.: 13/929,197

(22) Filed: Jun. 27, 2013

(65) Prior Publication Data

US 2015/0002118 A1   Jan. 1, 2015

(51) Int. Cl.
   *H02M 3/07*   (2006.01)
(52) U.S. Cl.
   CPC ..................................... *H02M 3/07* (2013.01)
(58) Field of Classification Search
   CPC ............ H02M 3/07; H02M 2003/071; H02M 2003/072; H02M 2003/075; H02M 2003/076; H02M 2003/077; H02M 2003/078; H02M 3/073
   See application file for complete search history.

(56) References Cited

U.S. PATENT DOCUMENTS

| | | |
|---|---|---|
| 3,697,860 A | 10/1972 | Baker |
| 4,511,811 A | 4/1985 | Gupta |
| 4,583,157 A | 4/1986 | Kirsch et al. |
| 4,636,748 A | 1/1987 | Latham |
| 4,736,121 A | 4/1988 | Cini et al. |
| 4,888,738 A | 12/1989 | Wong et al. |
| 5,140,182 A | 8/1992 | Ichimura |
| 5,168,174 A | 12/1992 | Naso et al. |
| 5,175,706 A | 12/1992 | Edme |
| 5,263,000 A | 11/1993 | Van Buskirk et al. |
| 5,392,205 A | 2/1995 | Zavaleta |
| 5,436,587 A | 7/1995 | Cernea |
| 5,483,434 A | 1/1996 | Seesink |
| 5,508,971 A | 4/1996 | Cernea et al. |
| 5,521,547 A | 5/1996 | Tsukada |
| 5,539,351 A | 7/1996 | Gilsdorf et al. |
| 5,563,779 A | 10/1996 | Cave et al. |

(Continued)

FOREIGN PATENT DOCUMENTS

| | | |
|---|---|---|
| DE | 10 2007 026290 | 7/2008 |
| EP | 0 382 929 A | 8/1990 |

(Continued)

OTHER PUBLICATIONS

Feng Pan et al., "Charge Pump Circuit Design", McGraw-Hill, 2006, 26 pages.

(Continued)

*Primary Examiner* — Fred E Finch, III
*Assistant Examiner* — Rafael O De Leon Domenech
(74) *Attorney, Agent, or Firm* — Davis Wright Tremaine LLP

(57) ABSTRACT

A high voltage DC-DC voltage converted includes a charge pump section and an op-amp section. During ramp-up, the charge pump can drive the load and the op-amp is in a unity gain configuration until the output level reaches the regulation level. While under regulation, when the load current is small and the charge pump is typically inefficient, the charge pump portion can be disconnected from the load and idled, while the op-amp is reconfigures as a comparator to maintain the output. This allows for the pump portion to be optimized for the large currents while the op-amp portion can be used to also have high efficiency during the low current, regulation phase.

7 Claims, 6 Drawing Sheets

(56) References Cited

U.S. PATENT DOCUMENTS

| | | |
|---|---|---|
| 5,563,825 A | 10/1996 | Cernea et al. |
| 5,568,424 A | 10/1996 | Cernea et al. |
| 5,570,315 A | 10/1996 | Tanaka et al. |
| 5,592,420 A | 1/1997 | Cernea et al. |
| 5,596,532 A | 1/1997 | Cernea et al. |
| 5,602,794 A | 2/1997 | Javanifard et al. |
| 5,621,685 A | 4/1997 | Cernea et al. |
| 5,625,544 A | 4/1997 | Kowshik et al. |
| 5,693,570 A | 12/1997 | Cernea et al. |
| 5,732,039 A | 3/1998 | Javanifard et al. |
| 5,734,286 A | 3/1998 | Takeyama et al. |
| 5,767,735 A | 6/1998 | Javanifard et al. |
| 5,781,473 A | 7/1998 | Javanifard et al. |
| 5,801,987 A | 9/1998 | Dinh |
| 5,818,766 A | 10/1998 | Song |
| 5,828,596 A | 10/1998 | Takata et al. |
| 5,903,495 A | 5/1999 | Takeuchi et al. |
| 5,943,226 A | 8/1999 | Kim |
| 5,945,870 A | 8/1999 | Chu et al. |
| 5,969,565 A | 10/1999 | Naganawa |
| 5,969,988 A | 10/1999 | Tanzawa et al. |
| 5,973,546 A | 10/1999 | Le et al. |
| 5,982,222 A | 11/1999 | Kyung |
| 6,008,690 A | 12/1999 | Takeshima et al. |
| 6,018,264 A | 1/2000 | Jin |
| 6,023,187 A | 2/2000 | Camacho et al. |
| 6,026,002 A | 2/2000 | Viehmann |
| 6,046,935 A | 4/2000 | Takeuchi et al. |
| 6,104,225 A | 8/2000 | Taguchi et al. |
| 6,107,862 A | 8/2000 | Mukainakano et al. |
| 6,134,145 A | 10/2000 | Wong |
| 6,147,566 A | 11/2000 | Pizzuto et al. |
| 6,151,229 A | 11/2000 | Taub et al. |
| 6,154,088 A | 11/2000 | Chevallier et al. |
| 6,157,242 A | 12/2000 | Fukui |
| 6,188,590 B1 | 2/2001 | Chang et al. |
| 6,198,645 B1 | 3/2001 | Kotowski et al. |
| 6,208,198 B1 | 3/2001 | Lee |
| 6,249,445 B1 | 6/2001 | Sugasawa |
| 6,249,898 B1 | 6/2001 | Koh et al. |
| 6,275,096 B1 | 8/2001 | Hsu et al. |
| 6,278,294 B1 | 8/2001 | Taniguchi |
| 6,285,622 B1 | 9/2001 | Haraguchi et al. |
| 6,297,687 B1 | 10/2001 | Sugimura |
| 6,307,425 B1 | 10/2001 | Chevallier et al. |
| 6,314,025 B1 | 11/2001 | Wong |
| 6,320,428 B1 | 11/2001 | Atsumi et al. |
| 6,320,796 B1 | 11/2001 | Voo et al. |
| 6,329,869 B1 | 12/2001 | Matano |
| 6,344,959 B1 | 2/2002 | Milazzo |
| 6,344,984 B1 | 2/2002 | Miyazaki |
| 6,356,062 B1 | 3/2002 | Elmhurst et al. |
| 6,359,798 B1 | 3/2002 | Han et al. |
| 6,369,642 B1 | 4/2002 | Zeng et al. |
| 6,370,075 B1 | 4/2002 | Haeberli et al. |
| 6,385,107 B1 | 5/2002 | Bedarida et al. |
| 6,400,202 B1 | 6/2002 | Fifield et al. |
| 6,404,274 B1 | 6/2002 | Hosono et al. |
| 6,411,157 B1 | 6/2002 | Hsu et al. |
| 6,424,570 B1 | 7/2002 | Le et al. |
| 6,445,243 B2 | 9/2002 | Myono |
| 6,456,154 B2 | 9/2002 | Sugimura |
| 6,456,170 B1 | 9/2002 | Segawa et al. |
| 6,476,666 B1 | 11/2002 | Palusa et al. |
| 6,486,728 B2 | 11/2002 | Kleveland |
| 6,518,830 B2 | 2/2003 | Gariboldi et al. |
| 6,522,191 B1 | 2/2003 | Cha et al. |
| 6,525,614 B2 | 2/2003 | Tanimoto |
| 6,525,949 B1 | 2/2003 | Johnson et al. |
| 6,531,792 B2 | 3/2003 | Oshio |
| 6,538,930 B2 | 3/2003 | Ishii et al. |
| 6,545,529 B2 | 4/2003 | Kim |
| 6,556,465 B2 | 4/2003 | Wong et al. |
| 6,577,535 B2 | 6/2003 | Pasternak |
| 6,606,267 B2 | 8/2003 | Wong |
| 6,661,682 B2 | 12/2003 | Kim et al. |
| 6,703,891 B2 | 3/2004 | Tanaka |
| 6,724,241 B1 | 4/2004 | Bedarida et al. |
| 6,734,718 B1 | 5/2004 | Pan |
| 6,737,907 B2 | 5/2004 | Hsu et al. |
| 6,760,262 B2 | 7/2004 | Haeberli et al. |
| 6,762,640 B2 | 7/2004 | Katsuhisa |
| 6,781,440 B2 | 8/2004 | Huang |
| 6,798,274 B2 | 9/2004 | Tanimoto |
| 6,819,162 B2 | 11/2004 | Pelliconi |
| 6,834,001 B2 | 12/2004 | Myono |
| 6,859,091 B1 | 2/2005 | Nicholson et al. |
| 6,878,981 B2 | 4/2005 | Eshel |
| 6,891,764 B2 | 5/2005 | Li |
| 6,894,554 B2 | 5/2005 | Ito |
| 6,922,096 B2 | 7/2005 | Cernea |
| 6,927,441 B2 | 8/2005 | Pappalardo et al. |
| 6,933,768 B2 | 8/2005 | Hausmann |
| 6,944,058 B2 | 9/2005 | Wong |
| 6,954,386 B2 | 10/2005 | Narui et al. |
| 6,975,135 B1 | 12/2005 | Bui |
| 6,985,397 B2 | 1/2006 | Tokui et al. |
| 6,990,031 B2 | 1/2006 | Hashimoto et al. |
| 6,995,603 B2 | 2/2006 | Chen et al. |
| 7,002,381 B1 | 2/2006 | Chung |
| 7,023,260 B2 | 4/2006 | Thorp et al. |
| 7,030,683 B2 | 4/2006 | Pan et al. |
| 7,092,263 B2 | 8/2006 | Chang |
| 7,113,023 B2 | 9/2006 | Cernea |
| 7,116,154 B2 | 10/2006 | Guo |
| 7,116,155 B2 | 10/2006 | Pan |
| 7,120,051 B2 | 10/2006 | Gorobets et al. |
| 7,123,078 B2 | 10/2006 | Seo |
| 7,129,759 B2 | 10/2006 | Fukami |
| 7,135,910 B2 | 11/2006 | Cernea |
| 7,135,911 B2 | 11/2006 | Imamiya |
| 7,205,682 B2 | 4/2007 | Kuramori |
| 7,208,996 B2 | 4/2007 | Suzuki et al. |
| 7,215,179 B2 | 5/2007 | Yamazoe et al. |
| 7,224,591 B2 | 5/2007 | Kaishita et al. |
| 7,227,780 B2 | 6/2007 | Komori et al. |
| 7,239,192 B2 | 7/2007 | Tailliet |
| 7,253,675 B2 | 8/2007 | Aksin et al. |
| 7,253,676 B2 | 8/2007 | Fukuda et al. |
| 7,259,612 B2 | 8/2007 | Saether |
| 7,276,960 B2 | 10/2007 | Peschke |
| 7,279,957 B2 | 10/2007 | Yen |
| 7,345,928 B2 | 3/2008 | Li |
| 7,368,979 B2 | 5/2008 | Govindu et al. |
| 7,397,677 B1 | 7/2008 | Collins et al. |
| 7,468,628 B2 | 12/2008 | Im et al. |
| 7,495,500 B2 | 2/2009 | Al-Shamma et al. |
| 7,521,978 B2 | 4/2009 | Kim et al. |
| 7,554,311 B2 | 6/2009 | Pan |
| 7,579,902 B2 | 8/2009 | Frulio et al. |
| 7,579,903 B2 | 8/2009 | Oku |
| 7,602,233 B2 | 10/2009 | Pietri et al. |
| 7,667,529 B2 | 2/2010 | Consuelo et al. |
| 7,671,572 B2 | 3/2010 | Chung |
| 7,696,812 B2 | 4/2010 | Al-Shamma et al. |
| 7,772,914 B2 | 8/2010 | Jung |
| 7,795,952 B2 | 9/2010 | Lui et al. |
| 7,830,203 B2 | 11/2010 | Chang et al. |
| 7,928,796 B2 | 4/2011 | Namekawa |
| 7,944,277 B1 | 5/2011 | Sinitsky et al. |
| 7,956,675 B2 | 6/2011 | Saitoh et al. |
| 7,973,592 B2 * | 7/2011 | Pan .................................. 327/536 |
| 8,093,953 B2 | 1/2012 | Pierdomenico et al. |
| 8,159,091 B2 | 4/2012 | Yeates |
| 8,193,853 B2 * | 6/2012 | Hsieh et al. ................... 327/536 |
| 8,242,834 B2 | 8/2012 | Chuang et al. |
| 8,339,183 B2 | 12/2012 | Htoo et al. |
| 8,395,440 B2 | 3/2013 | Sandhu et al. |
| 8,400,212 B1 * | 3/2013 | Nguyen et al. ................. 327/536 |
| 8,604,868 B2 | 12/2013 | Ucciardello et al. |
| 8,643,358 B2 | 2/2014 | Yoon |
| 2002/0008566 A1 | 1/2002 | Taito et al. |
| 2002/0014908 A1 | 2/2002 | Lauterbach |
| 2002/0075063 A1 | 6/2002 | Hwang |

(56) References Cited

U.S. PATENT DOCUMENTS

| | | |
|---|---|---|
| 2002/0075706 A1 | 6/2002 | Foss et al. |
| 2002/0130701 A1 | 9/2002 | Kleveland |
| 2002/0130704 A1 | 9/2002 | Myono et al. |
| 2002/0140463 A1 | 10/2002 | Cheung |
| 2003/0128560 A1 | 7/2003 | Saiki et al. |
| 2003/0214346 A1 | 11/2003 | Pelliconi |
| 2004/0046603 A1 | 3/2004 | Bedarida et al. |
| 2005/0024125 A1 | 2/2005 | McNitt et al. |
| 2005/0030088 A1 | 2/2005 | Cernea |
| 2005/0093614 A1 | 5/2005 | Lee |
| 2005/0195017 A1 | 9/2005 | Chen et al. |
| 2005/0237103 A1 | 10/2005 | Cernea |
| 2005/0248386 A1 | 11/2005 | Pan et al. |
| 2006/0114053 A1 | 6/2006 | Sohara et al. |
| 2006/0119393 A1 | 6/2006 | Hua et al. |
| 2006/0244518 A1 | 11/2006 | Byeon et al. |
| 2006/0250177 A1 | 11/2006 | Thorp et al. |
| 2007/0001745 A1 | 1/2007 | Yen |
| 2007/0053216 A1 | 3/2007 | Alenin |
| 2007/0069805 A1 | 3/2007 | Choi et al. |
| 2007/0126494 A1 | 6/2007 | Pan |
| 2007/0139099 A1* | 6/2007 | Pan .............. 327/536 |
| 2007/0139100 A1 | 6/2007 | Pan |
| 2007/0210853 A1 | 9/2007 | Maejima |
| 2007/0211502 A1 | 9/2007 | Komiya |
| 2007/0222498 A1 | 9/2007 | Choy et al. |
| 2007/0229149 A1 | 10/2007 | Pan et al. |
| 2008/0024096 A1* | 1/2008 | Pan .............. 323/271 |
| 2008/0024198 A1 | 1/2008 | Bitonti et al. |
| 2008/0042731 A1 | 2/2008 | Daga et al. |
| 2008/0068067 A1* | 3/2008 | Govindu et al. .............. 327/536 |
| 2008/0111604 A1 | 5/2008 | Boerstler et al. |
| 2008/0116963 A1 | 5/2008 | Jung |
| 2008/0136500 A1 | 6/2008 | Frulio et al. |
| 2008/0157731 A1* | 7/2008 | Pan .............. 323/265 |
| 2008/0157852 A1 | 7/2008 | Pan |
| 2008/0157859 A1 | 7/2008 | Pan |
| 2008/0218134 A1 | 9/2008 | Kawakami |
| 2008/0239802 A1 | 10/2008 | Thorp |
| 2008/0239856 A1 | 10/2008 | Thorp |
| 2008/0278222 A1 | 11/2008 | Conte et al. |
| 2008/0307342 A1 | 12/2008 | Furches et al. |
| 2009/0033306 A1 | 2/2009 | Tanzawa |
| 2009/0051413 A1 | 2/2009 | Chu et al. |
| 2009/0058506 A1 | 3/2009 | Nandi et al. |
| 2009/0058507 A1 | 3/2009 | Nandi et al. |
| 2009/0091366 A1 | 4/2009 | Baek et al. |
| 2009/0121780 A1 | 5/2009 | Chen et al. |
| 2009/0153230 A1 | 6/2009 | Pan et al. |
| 2009/0153231 A1 | 6/2009 | Pan et al. |
| 2009/0153232 A1 | 6/2009 | Fort et al. |
| 2009/0167418 A1 | 7/2009 | Ragavan |
| 2009/0174441 A1 | 7/2009 | Gebara et al. |
| 2009/0184697 A1 | 7/2009 | Park |
| 2009/0219077 A1 | 9/2009 | Pietri et al. |
| 2009/0315616 A1 | 12/2009 | Nguyen et al. |
| 2009/0322413 A1 | 12/2009 | Huynh et al. |
| 2010/0019832 A1 | 1/2010 | Pan |
| 2010/0033232 A1 | 2/2010 | Pan |
| 2010/0074034 A1 | 3/2010 | Cazzaniga |
| 2010/0085794 A1 | 4/2010 | Chen et al. |
| 2010/0244935 A1 | 9/2010 | Kim et al. |
| 2010/0302877 A1 | 12/2010 | Bang |
| 2011/0026329 A1 | 2/2011 | Wada |
| 2011/0133821 A1 | 6/2011 | Honda |
| 2011/0156803 A1 | 6/2011 | Yap et al. |
| 2011/0254615 A1 | 10/2011 | Raghunathan et al. |
| 2012/0230071 A1 | 9/2012 | Kaneda |
| 2012/0274394 A1* | 11/2012 | Chan .............. 327/536 |
| 2013/0162229 A1 | 6/2013 | Chan |
| 2013/0181521 A1* | 7/2013 | Khlat .............. 307/31 |
| 2014/0085985 A1* | 3/2014 | Pan et al. .............. 365/185.18 |
| 2014/0375293 A1* | 12/2014 | Pan et al. .............. 323/293 |

FOREIGN PATENT DOCUMENTS

| | | |
|---|---|---|
| EP | 0 780 515 A | 6/1997 |
| JP | 2007-020268 | 1/2007 |
| WO | 01/06336 A1 | 1/2001 |
| WO | WO 2006/132757 | 12/2006 |

OTHER PUBLICATIONS

Ang et al., "An On-Chip Voltage Regulator Using Switched Decoupling Capacitors," 2000 IEEE International Solid-State Circuits Conference, 2 pages.

U.S. Appl. No. 12/506,998 entitled "Charge Pump with Current Based Regulation" filed Jul. 21, 2009, 21 pages.

U.S. Appl. No. 12/634,385 entitled "Multi-Stage Charge Pump with Variable Number of Boosting Stages" filed Dec. 9, 2009, 33 pages.

\* cited by examiner

EFFICIENT HIGH VOLTAGE BIAS REGULATION CIRCUIT

FIELD OF THE INVENTION

This invention pertains generally to the field of DC-DC voltage converters and, more particularly, to techniques improving the power efficiency of maintaining a regulated output level.

BACKGROUND

Charge pumps use a switching process to provide a DC output voltage larger or lower than its DC input voltage. In general, a charge pump will have a capacitor coupled to switches between an input and an output. During one clock half cycle, the charging half cycle, the capacitor couples in parallel to the input so as to charge up to the input voltage. During a second clock cycle, the transfer half cycle, the charged capacitor couples in series with the input voltage so as to provide an output voltage twice the level of the input voltage. This process is illustrated in FIGS. 1a and 1b. In FIG. 1a, the capacitor 5 is arranged in parallel with the input voltage $V_{IN}$ to illustrate the charging half cycle. In FIG. 1b, the charged capacitor 5 is arranged in series with the input voltage to illustrate the transfer half cycle. As seen in FIG. 1b, the positive terminal of the charged capacitor 5 will thus be 2* $V_{IN}$ with respect to ground.

Charge pumps are used in many contexts. For example, they are used as peripheral circuits on flash and other non-volatile memories to generate many of the needed operating voltages, such as programming or erase voltages, from a lower power supply voltage. A number of charge pump designs, such as conventional Dickson-type pumps, are know in the art. But given the common reliance upon charge pumps, there is an on going need for improvements in pump design, particularly with respect to trying to save on current consumption and reduce the amount ripple in the output of the pump.

SUMMARY OF THE INVENTION

A voltage conversion circuit provides an output voltage at an output node and includes a charge pump circuit and regulation circuitry. The charge pump circuit is responsive to a pump enable signal to generate the output voltage. The output voltage from the charge pump can be provided by a first switch to the output node. The regulation circuitry includes a voltage divider circuit connected between the output node and ground and a comparator connected to receive a first reference voltage at a first input, having a second input connected to a first node of the voltage divider circuit, and providing the pump enable signal as an output. The regulation circuitry also includes an op-amp, where the op-amp is connected to receive a second reference voltage at a first input and having a second input connected to a second node of the voltage divider circuit, and a first capacitor connected between the output of the op-amp and the output node. The first switch is closed during a set-up phase when the voltage at the output node is ramping up and open during a regulation phase when the voltage level at the output node is being maintained. In one exemplary embodiment, the first and second nodes of the voltage divider circuit are the same and the second input of the op-amp is connected to this node through a capacitor.

Various aspects, advantages, features and embodiments of the present invention are included in the following description of exemplary examples thereof, which description should be taken in conjunction with the accompanying drawings. All patents, patent applications, articles, other publications, documents and things referenced herein are hereby incorporated herein by this reference in their entirety for all purposes. To the extent of any inconsistency or conflict in the definition or use of terms between any of the incorporated publications, documents or things and the present application, those of the present application shall prevail.

BRIEF DESCRIPTION OF THE DRAWINGS

The various aspects and features of the present invention may be better understood by examining the following figures, in which.

DETAILED DESCRIPTION

Capacitive Regulation of Charge Pumps without Refresh Operation Interruption

The techniques presented here are widely applicable to various charge pump designs that use capacitive regulation. In capacitive regulation, when capacitors are connected in series in the feedback network, the feedback network relies on conservation of a charge principle to sample the output voltage. Due to junction leakage, sub-threshold leakage, or a combination of these, conservation of charge cannot be held over long times without introducing significant output error. Because of this, operation of the pump system needs to be interrupted at periodic intervals (based on the leakage rate on the intermediate node of capacitors and their size) for the capacitors to be refreshed periodically if the operation is long compared with leakage tolerance. Without this refresh, the violation of charge conservation would introduce significant error in output being regulated. This need to refresh can significantly affect the performance and power impact of the pump system as operations are interrupted in order to refresh all nodes of the capacitors before the next regulation.

The following is primarily concerned with the regulation circuitry of charge pump systems rather than the details of the pump itself. For example, the pump can be based on a Dickson-type pump, voltage doubles, and so on. More detail on various pumps and pump system within which the following concepts can be applied can be found, for example, in "Charge Pump Circuit Design" by Pan and Samaddar, McGraw-Hill, 2006, or "Charge Pumps: An Overview", Pylarinos and Rogers, Department of Electrical and Computer Engineering University of Toronto, available on the webpage "www.eecg.toronto.edu/~kphang/ece1371/ chargepumps.pdf". Further information on various other charge pump aspects and designs can be found in U.S. Pat. Nos. 5,436,587; 6,370,075; 6,556,465; 6,760,262; 6,922,096; 7,030,683; 7,554,311; 7,368,979; 7,795,952; 7,135,910; 7,973,592; and 7,969,235; US Patent Publication numbers 2009-0153230-A1; 2009-0153232-A1; 2009-0315616-A1; 2009-0322413-A1; 2009-0058506-A1; US-2011-0148509-A1; 2007-0126494-A1; 2007-0139099-A1; 2008-0307342 A1; 2009-0058507 A1; 2012-0154023; 2012-0154022; and 2013-0063118; and U.S. patent application Ser. Nos.: 13/618, 482; 13/628,465; 13/886,066; and 13/921,072.

Figure 1A:
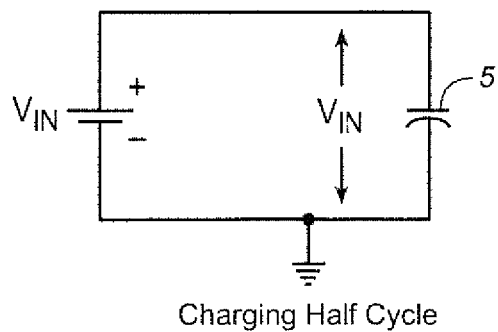
FIG. 1a is a simplified circuit diagram of the charging half cycle in a generic charge pump.
Figure 1B:
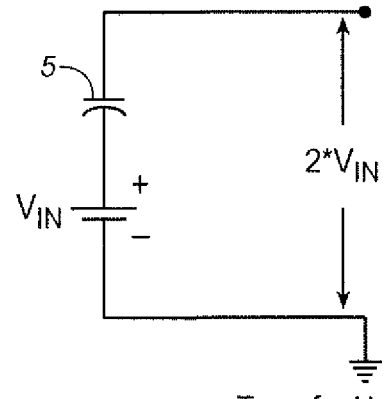
FIG. 1b is a simplified circuit diagram of the transfer half cycle in a generic charge pump.
Figure 2:
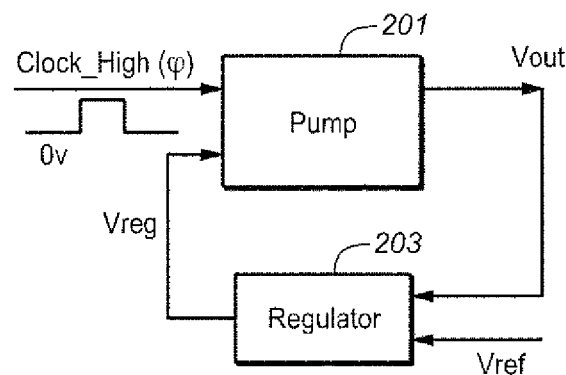
FIG. 2 is a top-level block diagram for a regulated charge pump.

FIG. 2 is a top-level block diagram of a typical charge pump using an output voltage based regulation scheme. As shown in FIG. 2, the pump 201 has as inputs a clock signal and a voltage Vreg and provides an output Vout. The clock generation circuit is not explicitly shown in FIG. 2, although it may be considered part of the charge pump system in some embodiments or taken as an external input. The high (Vdd) and low (ground) connections are also not explicitly shown. The voltage Vreg is provided by the regulator 203, which has as inputs a reference voltage Vref from an external voltage source and the output voltage Vout. The regulator block 203 generates feedback control signal Vreg such that the desired value of Vout can be obtained. The pump section 201 may have any of various designs for charge pumps, such as described in the various references cited above including charge doubler-type circuits with cross-coupled elements as well as the Dickson-type pumps described below for the exemplary embodiments. (A charge pump is typically taken to refer to both the pump portion 201 and the regulator 203, when a regulator is included, although in some usages "charge pump" refers to just the pump section 201. In the following, the terminology "charge pump system" will often be used to describe pump itself as well as any regulation or other peripheral elements.) The regulator block 203 typically compares the Vref to the Vout value by using a voltage divider circuit. The voltage divider can be a resistive divider, a capacitive divider, or some combination (see, for example, U.S. Pat. No. 7,554,311).

Using a capacitive feedback network has the advantage of having no DC current load to the output supply, something that is a particular advantage in low power applications. The feedback regulation is then based on the principle of charge conservation at the node of the capacitive divider. As noted above, for relatively long operations, junction or sub-threshold voltage leakage may inject or leak charge away from the divider's node, violating charge conservation over time. If the time of the operation exceeds the maximum allowed charge leakage and derived error on the regulated output voltage, the operation needs to be suspended and the nodes of the capacitors reset before resuming the operation. For example, in an NAND flash memory the refresh constraint can limit the maximum pulse time of an erase operation, so that an erase operation would need to be broken down into multiple pulses. Although discussed here in the context of a purely capacitive divider, this can also apply to other dividers with capacitive elements that are otherwise not sufficiently refreshed.

Figure 3A:
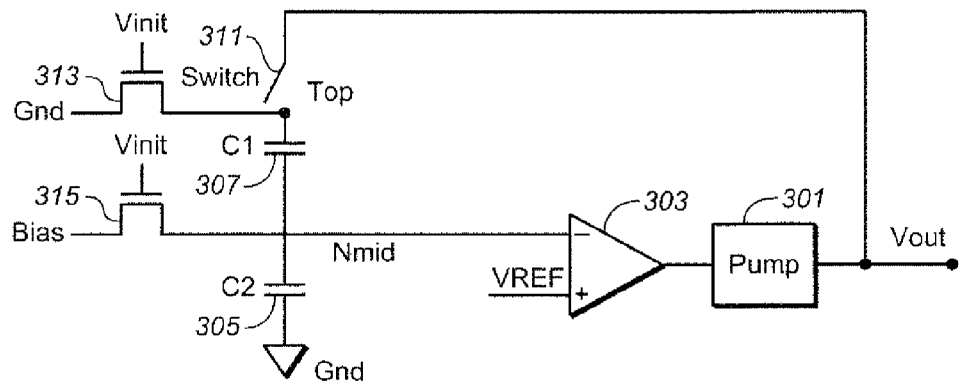
FIGS. 3A-C illustrate a charge pump system using a capacitive voltage divider and some possible sources of leakage.
Figure 3B:
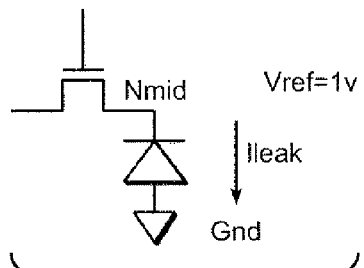
Figure 3C:
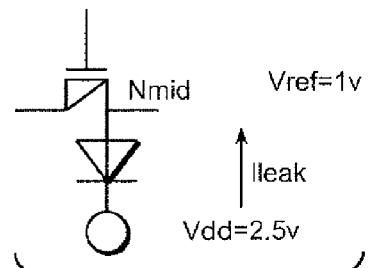

This can be illustrated with respect to FIGS. 3A-C. FIG. 3A schematically illustrates a charge pump system where a pump 301 supplies an output voltage Vout based upon the output of the comparator 303. The comparator has a reference voltage VREF as one input and is connected to a node Nmid of a voltage divider connected to provide feedback from the Vout level. The voltage divider has a first capacitor C1 307 connected between the Vout level and the Nmid node and a second capacitor C2 305 connected between Nmid and ground. When operating under regulation, the level on Nmid is compared to Vref to control the pump's operation.

Some of the sources of the leakage are illustrated in FIGS. 3B and 3C. FIG. 3B shows the case of NMOS junction leakage, where a current Beak drains charge off of Nmid to ground for some exemplary values. FIG. 3C similarly illustrates PMOS junction leakage where the current flows on to Nmid. Due this leakage, the capacitors may eventually need refreshing. This refreshing can be accomplished by opening the switch 311, connecting the Top node to ground through transistor 313 and the node Nmid to the level Bias through transistor 315. Once the capacitors are reset, the nodes Top and Nmid can be disconnected from ground and Bias, the switch 311 closed, and the pump can resume operation. Initially, the charge on the Nmid node is:

$$Q_nmid(inital) = Vbias \cdot (C1+C2)$$

while under regulation (assuming the loop gain of charge pump is high enough), Vnmid will be same as VREF. Then:

$$Q_nmid(final) = C1 \cdot (Vref - Vout) + C2 \cdot Vref$$

Due to the charge conservation principle, $$Vout = (C1+C2) \cdot (Vref - Vbias)/C1.$$

For example, taking Vbias=0V, Vref=1V, C1=1 pF, and C2=2pF, this gives Vout=(1+2)*(1−0)/1=3V. If charge conservation is not held, then the regulation level on the output will deviate from this target value over time. Interrupting operations for a reset will impact performance. This will waste power as the circuits and voltages need to reset and the restart the system again will need all the voltages to ramp back up to regulation levels.

The techniques described here can be applied to both positive and negative charge pumps. For example in the positive charge pump case, Vbias can be taken as 0V and Vref as 1.0-1.2V. For a negative pump, Vbias can be set at 1.0V-1.2V and Vref can be in the 0-0.2V range. The actual levels used can be based on the common mode input range of the comparator used in the design.

Figure 4A:
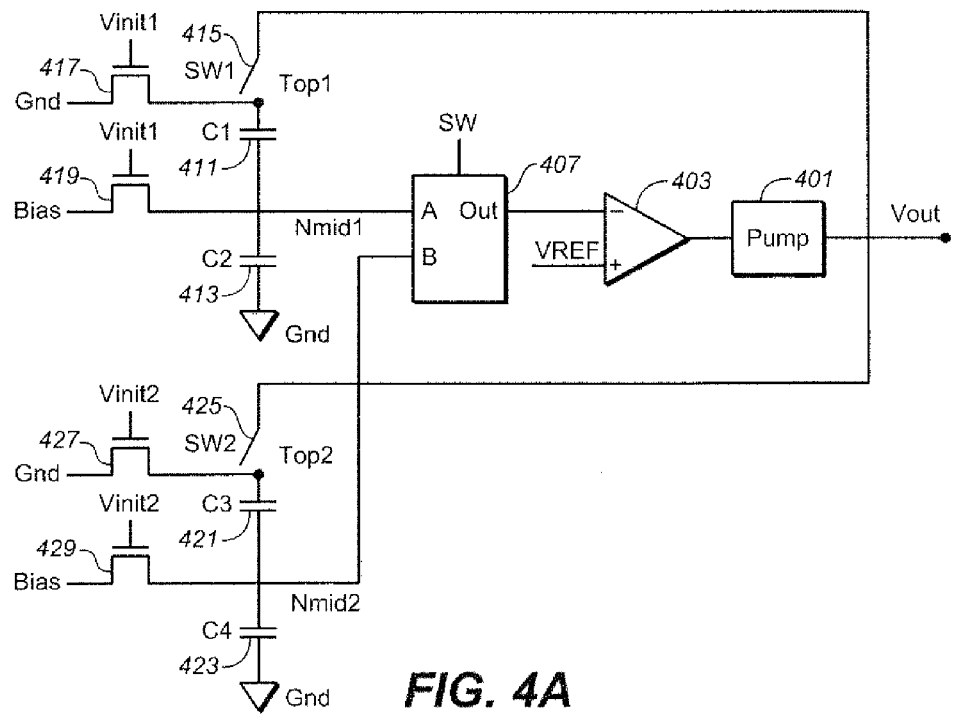
FIGS. 4A and B illustrate an exemplary embodiment of a charge pump system.
Figure 4B:
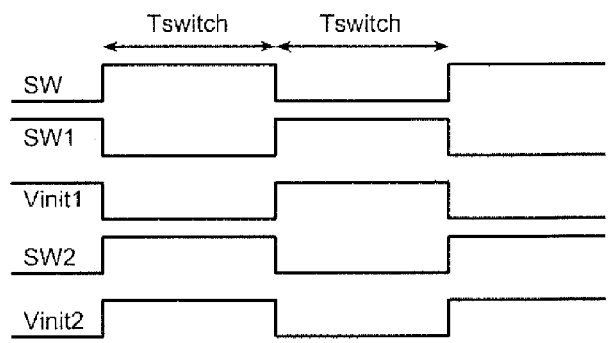

FIGS. 4A and 4B illustrate an exemplary embodiment of a circuit to overcome these difficulties. As before, FIG. 4A shows the output of the pump 401 is governed by the output of a comparator 403 that has a reference value Vref at one input and feedback from the output at the other input. Now, however there are two sets of capacitive dividers, one formed of capacitors C1 411 and capacitor C2 413 and the other formed of capacitors C3 421 and C4 423. Each of the dividers has its own reset circuit, the switch SW1 415 and transistors 417 and 419 controlled by Vinit1 for one and the switch SW2 425 and transistors 427 and 429 controlled by Vinit2 for the other. The feedback voltage is switched between the different dividers based on a signal SW supplied to the multiplex circuit 407. The signals SW and well as Vint1, Vint2 and the signals controlling SW1 and SW2 can be provided by control circuitry (not illustrated) based, for example, a multiple of some system clock. While one of the dividers is working, the other can be reset. The period of the switching (Tswitch) can be determined based on leakage calculations and capacitor size, and derived based on the allowable output error that the system is allowed to tolerate. By alternating which of the dividers is active and which is being reset, the pump's operation can be maintained without interruption needed to reset pump and load. This allows the system to maximize performance and power savings.

FIG. 4B illustrates an example of the control siganls involved. As shown at top, the SW to the multiplex circuit alternates between high (when A is connected) and low (when B is connected) with a period Tswitch. When the top feedback loop is active, the switch SW1 415 is closed (SW1 low in FIG. 4B, SW1 is active low) to complete the feedback loop and the transistors 417 and 419 are turned off (Vint1 low). While the top loop is active, the bottom divider can be reset by openning SW2 425 (SW2 high in FIG. 4B, SW2 is active low) and connecting the Top2 node to ground and Nmid2 to Bias by having Vint2 high. The singals are then swapped to have the bottom loop at B active and the top loops capacitors can be reset.

FIGS. 4A and 4B illustrate an example using a fairly simple, purely capacitive voltage divider, but the techniques can be applied to other feedback loops that can benefit from periodic refreshing, such as the sort of hybrid arrangement of U.S. Pat. No. 7,554,311. For any of these variations, the describe approach allows for operations to continue with needing to stop for reset, allowing the systems output to continue under regulation without interruption. Consequently, there is no extra delay or power required for this reason. This makes the aspects present here particularly useful many charge pump applications, such as for peripheral circuitry on NAND or other non-volatile memories, for example.

The above is developed further in U.S. patent application Ser. No. 13/926,442.

Efficient High Voltage Bias Regulation

This section looks at improving the power efficiency the regulation of high voltage DC-DC converters. The exemplary embodiment of a charge pump system will again use a capacitive divider as in the preceding discussion, but can be applied more generally.

DC-DC converters are typically optimized for power efficiency for the supplying large load currents. For example, on a non-volatile memory system this requirement is mainly related to AC capacitive current to needed charge up word lines. The efficiency of the system may drop to extremely low levels, less than 1% in some applications, after the capacitive load is charged up and the load current reduces to just what is needed due to leakage, as is the case during regulation to maintain word line voltages. Although performance requirements are based on the charging-up period, the system will typically be operating under regulation for a greater amount of time. To improve overall power efficiency, the power efficiency during regulation needs to be improved since it accounts for a significant amount of total operation time. The following presents techniques to bypass the limitations due to the DC-DC, charge power efficiency curve, and be able to remove bi-direction noise with near 100% of power efficiency.

Figure 5:
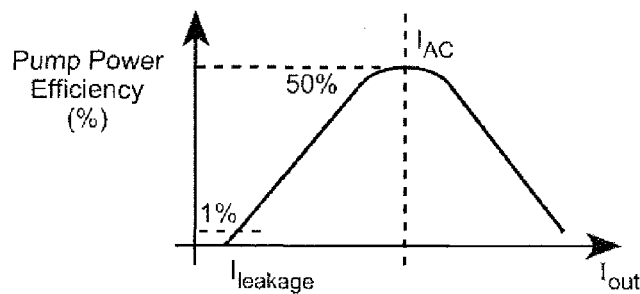
FIG. 5 illustrates the power efficiency of a charge pump system for various load levels.

FIG. 5 illustrates the efficiency of a charge pump system for various load levels. As shown, the DC-DC converter is optimized for power efficiency for the certain large load current levels, $I_{AC}$, mainly related to the main task for the pump, such as AC capacitive current to charge up word lines in a memory circuit example. Once this capacitance is charge up, the load current will reduce down to the leakage current, $I_{leakage}$, and the efficiency drops significantly, to possibly even below 1%. In the memory circuit example, $I_{leakage}$, is the level needed during regulation to maintain the word line voltage. To improve overall power efficiency for the system, power efficiency during regulation needs to be improved since it accounts for a significant amount of total operation time. Previous approaches to deal with this problem include improving pump design, adding controls, and so on, but in the end the efficiency is still limited to the DC-DC converter bell shape curve illustrated in FIG. 5.

Under the aspects presented here, instead of using the pump to maintain the load during regulation, when the load requirements are small, such as just leakage or noise injection current, the system uses an op-amp and AC capacitance to remove the constraints of low pump power efficiency. The arrangement uses low bandwidth op-amp feedback and open loop controls to achieve near 100% of power efficiency. The added low bandwidth OpAmp, capacitance and switches are can be minimal in additional area and power consumption. The output current of op-amp can be of the same order as leakage current or noise injection current attenuated by acceptable error in term of the voltage under regulation. These improvements can significantly increase efficiency.

Figure 6:
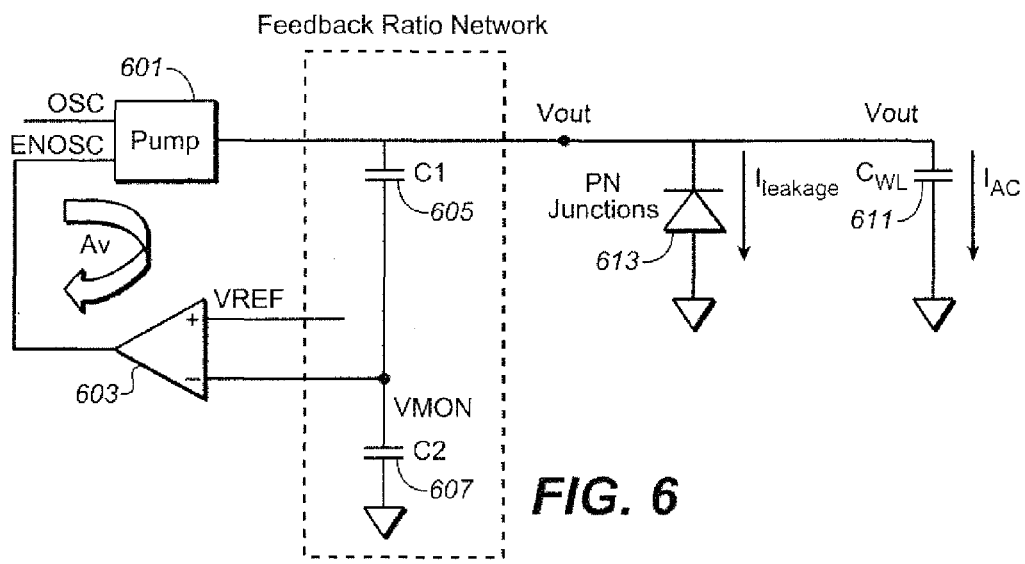
FIG. 6 is an example of a change pump system.

FIG. 6 looks at a fairly typical change pump system of a charge pump 601 connected to receive an oscillator signal OSC and an enable signal ENOSC and provide an output voltage at OUT. The ENOSC signal comes from regulation circuit of a comparator 603 with a gain Av having inputs Vref and the level VMON taken from a node of the capacitive divider formed by the capacitors C1 605 and C3 607 connected between the output node and ground. Other forms of voltage dividers can be used, but here a purely capacitive divider is used as much of the focus here is on reducing current/power consumption. Consequently, the arrangement of FIG. 6 is much the same as in FIG. 3A, but with the reset circuit suppressed. The output is connected to drive a load here schematically represented by the capacitance $C_{WL}$ 611 corresponding the word line capacitance of the exemplary application) that would draw a current $I_{AC}$ and a PN junction 613 taken to represent the leakage component. Once the output ramps up, the ratio (Vout/Vref) of the output voltage to the reference value is given by $(Av/(1+Av*\beta))$, where Av is the gain of the op-amp and $\beta$ is the ratio of $(sc2)^{-1}/((sc1)^{-1}+(sc2)^{-1})$, with c1, c2 respectively as the capacitances of C1 605, C2 607 and s the transform parameter. The load current components are taken as having $I_{leakage} \ll I_{AC}$.

Figure 7:
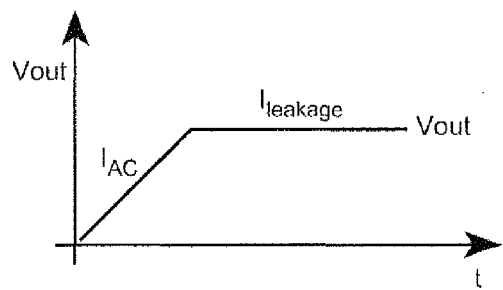
FIG. 7 illustrates the behavior of a charge pump system over time in driving a load.

FIG. 7 illustrates the behavior of the charge pump system over time in driving the load. Initially, the capacitive load $C_{WL}$ 611 needs to be charged up and, as this is an important factor of device performance, the system is largely optimized for this purpose. This is the initial phase of FIG. 7, where the $I_{AC}$ indicates this phase. After $C_{WL}$ 611 is charged up, the majority of operation for pump is to maintain the low bandwidth leakage current $I_{leakage}$. Power efficiency is optimized to be high for the word line settling time, but is extremely low when maintaining the very low leakage current.

Figure 8A:
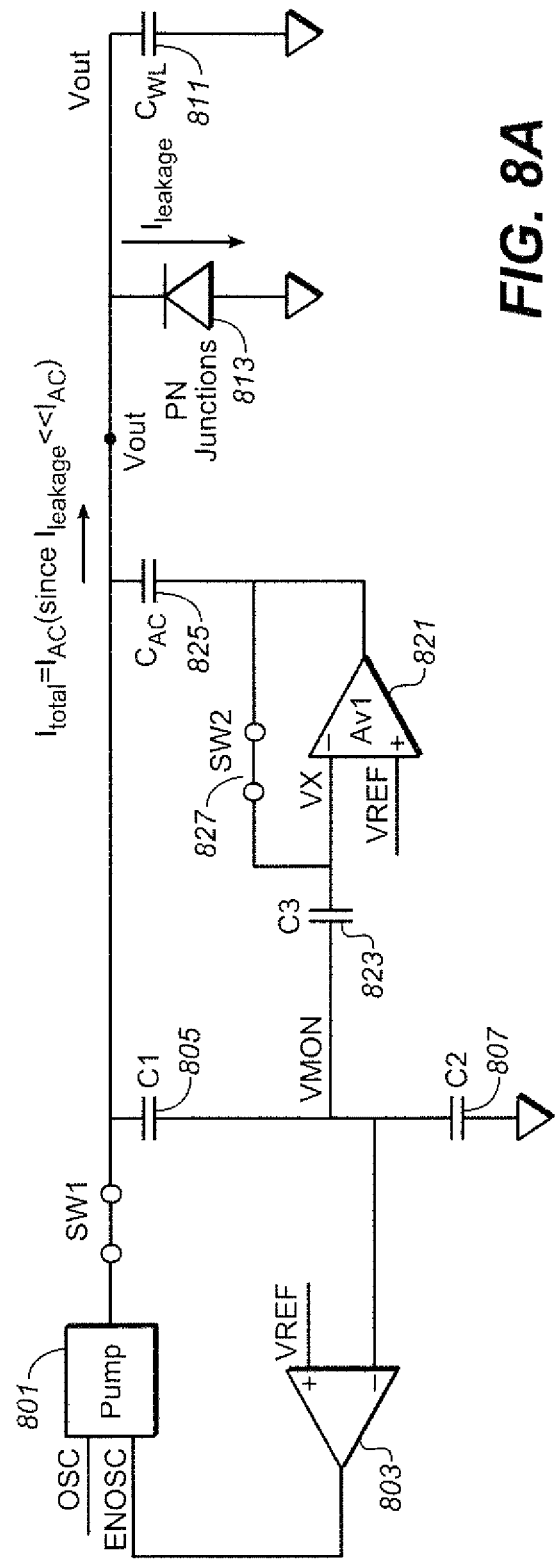
FIGS. 8A and 8B illustrate an exemplary embodiment during the setup phase and regulation phases, respectively.
Figure 8B:
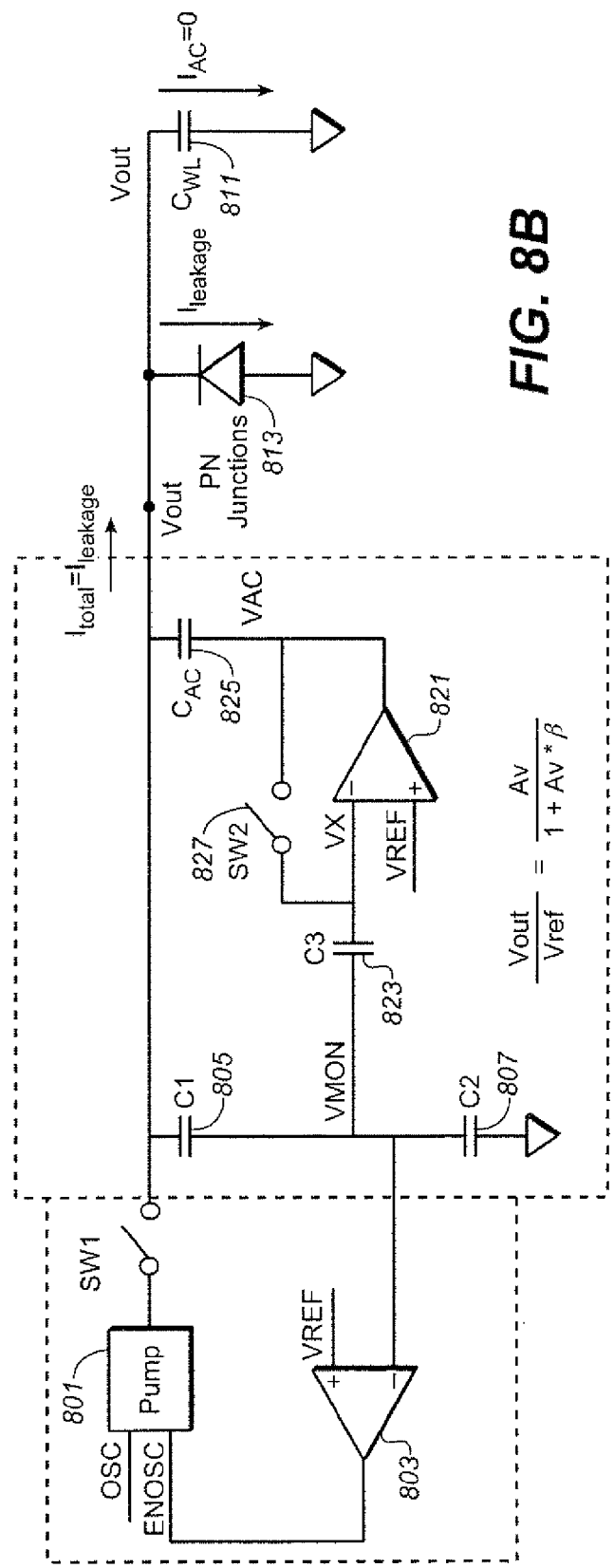

FIGS. 8A and 8B illustrate an exemplary embodiment illustrating a number of the aspects of this section. The circuit again includes the elements of FIG. 6 which are similarly numbered (pump 601 is now 801 and so on), but also includes a unity gain op-amp section. A switch SW1 809 is added in between the load and charge pump circuits, which can be controlled by the pump comparator output and logic. The switch SW2 827 is added in the feedback path of the op-amp 821. FIG. 8A illustrates the setup phase when both of SW1 809 and SW2 827 are closed. The low bandwidth op-amp 821, a capacitor $C_{AC}$ 825, and a capacitor $C_3$ 823 are inserted in the control loop. The total quiescent current of these elements is typically of the same order as $I_{leakage}$. During the setup phase, the charge pump is operating as usual to bring the output level up to the regulation point. The output node of the op-amp 821, $V_{AC}$, is biased at a metastable point before Vout reach the target regulation level, where the offset error is sampled into $C_3$ 823. Op-amp 821 has gain Av1 and is arranged so that $(VAC/Vref)=(Av1/(1+Av1))$ and in this embodiment, both of 821 and 801 use the same reference level Vref.

FIG. 8B illustrates the leakage current compensation phase, when op-amp 821 is configured as a comparator. The switch SW1 809 is opened and the pump related circuits can be turned off to cut off power consumption. Switch SW2 827 and the other elements added relative to FIG. 6 (op-amp821 and capacitors $C_{AC}$ 825 and $C_3$ 823) and the feedback network of C1 805 and C2 807 maintain the Vout level during regulation and maintain the leakage current and noise injection. With the switches open, the comparator 821 will maintain the ratio of (Vout/Vref) as (Av/(1+Av*β)). As the pump can be disabled, the low pump efficiency during regulation is avoided.

Consequently, initially, during the reset phase, the op-amp 821 is in a unity gain configuration while the pump 801 is ramping up the output the output voltage Vout until it hits the regulation level using the typical pump regulation. At this point, the switch SW2 827 is turned off to configure the op-amp 821 into a comparator; and, as the pump is no longer being used, the switch SW1 809 is also turned off. The timing for the switches SW1 809 and SW2 827 can be timer controlled, using a fixed amount of time with a margin based upon the design, for example. Alternately the switches can be enabled by the pump enable signal, so that SW1 809 and SW2 827 turn off when pump regulation flag indicates that the regulation level is reached.

Looking at the leakage compensation phase (when Sw1, SW2 are open) in more detail, the following equations apply:

$$I_{AC} = \frac{VAC - Vout}{1/SC_{AC}}$$

$$I_{AC} = S(VAC - Vout) * C_{AC}$$

$$I_{AC} = j\omega(VAC - Vout) * C_{AC}$$

$$|I_{AC}| = \omega(VAC - Vout) * C_{AC}.$$

In the case that Vout is dropping due to $I_{leakage}$, then:

$$\Delta Vmon = \beta \Delta Vout$$

$$\Delta Vx = \Delta Vmon.$$

The output VAC of comparator 821 will increase and inject $I_{AC}$ until Vout reach the original regulation target, at which point ΔVx return to 0 V. In the case of other noise current is injected to increase Vout, the same scenario can be applied and VAC will drop and $I_{AC}$ will sink the injected current until Vout reaches the original regulation target.

In the extreme case of $I_{leakage}$ approaching the maximum of the worst case design target, the comparator 821 will be slewing $C_{AC}$ 825 to maintain Vout. All of the comparator tail current will flow through $C_{AC}$ 825 into Vout to compensate $I_{leakage}$. In this case, 100% power efficiency can be achieved. If $I_{leakage}$ is smaller than worst case design target, then only a portion of comparator tail current is used to compensate for $I_{leakage}$ and the power efficiency will be correspondingly less than 100%. Consequently, relative to a more conventional DC-DC converter that has low power efficiency under low load current, the arrangement described with respect to FIGS. 8A and 8B can achieve near 100% power efficiency under nominal conditions.

The exemplary embodiment of FIGS. 8A and 8B use a capacitive divider (C1 805 and C2 807) for the feedback network to sample the output voltage as the focus here is on power saving, but other feedback networks can also be used as long the variation of the output signal can be sampled. For example, a resistive or hybrid feedback network, examples of which can be found in the references cited above, can also be used. In any case, an important aspect of this section is using the sampled voltage from output of regulated node with the op-amp 821 is reconfigured as a comparator. The comparator's/op-amp's 821 output VAC is DC isolated from the charge pump's 801output, while the AC coupling can be adjusted through the feedback loop to maintain the output voltage. The leakage current amplitude, $C_{AC}$ capacitance size, and range of the op-amp output swing range determine the design for application. For example, if the system uses resistive feedback in the feedback network, the high voltage output has two currents going to DC ground, one is related to leakage and then also one due to the regulation current going through the resistor divider. In this case, with same output swing range of the op-amp, a larger $C_{AC}$ capacitor would be required due to the increased DC current through feedback network.

For any of the embodiments, the aspects presented in this section can present significant improvements in power consumption. The use of bi-direction error correction during regulation can be used for either leakage current or injection noise current. In this way, this arrangement significantly improves the power efficiency from <1% using charge pump to near 100%. As the regulation phase can be a significant portion of operations in applications such as for read and program operations in NAND memory, the approach presented here can contribute significantly to power efficiency in such operations.

Conclusion

Although the invention has been described with reference to particular embodiments, the description is only an example of the invention's application and should not be taken as a limitation. Consequently, various adaptations and combinations of features of the embodiments disclosed are within the scope of the invention as encompassed by the following claims.

It is claimed:

1. A voltage conversion circuit to provide an output voltage at an output node, comprising;
    a charge pump circuit responsive to a pump enable signal to generate the output voltage;
    a first switch whereby the output voltage from the charge pump can be provided to the output node; and
    regulation circuitry, including :
        a voltage divider circuit connected between the output node and ground;
        a comparator connected to receive a first reference voltage at a first input, having a second input connected to a first node of the voltage divider circuit, and providing the pump enable signal as an output;
        an op-amp connected to receive a second reference voltage at a first input, and having a second input connected to a second node of the voltage divider circuit; and
        a first capacitor connected between the output of the op-amp and the output node,
    wherein the first switch is closed during a set-up phase when the voltage at the output node is ramping up and open during a regulation phase when the voltage level at the output node is being maintained.

2. The voltage conversion circuit of claim 1, wherein the regulation circuitry further includes:
    a second capacitor through which the second input of the op-amp is connected to the second node of the voltage divider circuit; and
    a second switch whereby the output of the op-amp can be connected to the second input of the op-amp, wherein the second switch is closed during the set-up phase and open during the regulation phase.

3. The voltage conversion circuit of claim 2, wherein the first and second nodes of the voltage divider circuit are the same and the first and second reference voltages are the same.

4. The voltage conversion circuit of claim 3, wherein the voltage divider circuit includes a third capacitor connected between the output node and the first node of the voltage divider circuit and a fourth capacitor connected between the first node of the voltage divider circuit and ground.

5. The voltage conversion circuit of claim 1, wherein during the regulation phase the charge pump circuit is turned off.

6. The voltage conversion circuit of claim 1, wherein the first switch is opened based upon a timer.

7. The voltage conversion circuit of claim 1, wherein the first switch is opened based upon the voltage level at the output node reaching a level.

\* \* \* \* \*